(12) United States Patent
Geernaert

(10) Patent No.: US 7,280,857 B2
(45) Date of Patent: Oct. 9, 2007

(54) MOBILE COMMUNICATIONS DEVICE HAVING ROTATING DISPLAY AND CAMERA

(75) Inventor: Adam Geernaert, Camberley (GB)

(73) Assignee: Nokia Corporation, Espoo (FI)

( * ) Notice: Subject to any disclaimer, the term of this patent is extended or adjusted under 35 U.S.C. 154(b) by 169 days.

(21) Appl. No.: 10/877,525

(22) Filed: Jun. 25, 2004

(65) Prior Publication Data

US 2005/0288075 A1    Dec. 29, 2005

(51) Int. Cl.
*H04M 1/00* (2006.01)
*H04M 9/00* (2006.01)
*H04B 1/38* (2006.01)

(52) U.S. Cl. .............. 455/575.4; 455/575.1; 455/566; 379/433.04

(58) Field of Classification Search ............. 455/575.1, 455/575.3, 575.4, 575.8, 566; 379/433.04, 379/433.11, 433.13, 433.12; D14/137–138, D14/216, 316, 326–327, 341, 345, 401
See application file for complete search history.

(56) References Cited

U.S. PATENT DOCUMENTS

| | | | |
|---|---|---|---|
| D392,968 S | 3/1998 | Johansson | D14/144 |
| D447,740 S | 9/2001 | Johansson | D14/138 |
| D501,838 S * | 2/2005 | Kim et al. | D14/138 |
| 7,003,318 B2 * | 2/2006 | Kota et al. | 455/556.1 |
| D518,807 S * | 4/2006 | Choi et al. | D14/138 |
| 7,050,767 B2 * | 5/2006 | Hickey et al. | 455/90.3 |
| 2003/0203747 A1 * | 10/2003 | Nagamine | 455/575.3 |
| 2004/0127262 A1 * | 7/2004 | Ohno | 455/566 |
| 2004/0185922 A1 * | 9/2004 | Sutton et al. | 455/575.1 |
| 2004/0192398 A1 * | 9/2004 | Zhu | 455/566 |
| 2005/0054393 A1 | 3/2005 | Fagerstrom et al. | 455/575.1 |
| 2005/0266898 A1 * | 12/2005 | Ahn et al. | 455/575.1 |

FOREIGN PATENT DOCUMENTS

| | | | |
|---|---|---|---|
| JP | 2002135380 A | * | 5/2002 |
| WO | WO 2100076 A1 | * | 12/2002 |
| WO | WO 3019911 A1 | * | 3/2003 |

OTHER PUBLICATIONS

Electronic Translation: JP 2002135380 A.*
Business World, "Imaging, MMS-capable phone takes center at Nokia's biggest launch to date", Del Castillo, 2001, 4 pages, no month listed.
Press Release, "Nokia's first imaging phone marks start of Multimedia Messaging era", Nokia Corporation, Nov. 19, 2001, 2 pages.

* cited by examiner

*Primary Examiner*—William Trost
*Assistant Examiner*—Marivelisse Santiago-Cordero
(74) *Attorney, Agent, or Firm*—Harrington & Smith, PC

(57) ABSTRACT

A hand-held mobile communications device including a housing; a movable section movably mounted to the housing; and at least one spring. The movable section includes a display screen. The movable section is adapted to axially rotate relative to the housing to move the movable section between a first portrait position and a second landscape position. The spring biases the movable section relative to the housing towards the first position or towards the second position.

5 Claims, 7 Drawing Sheets

MOBILE COMMUNICATIONS DEVICE HAVING ROTATING DISPLAY AND CAMERA

BACKGROUND OF THE INVENTION

1. Field of the Invention

The present invention relates to mobile communication devices and, more particularly, to a mobile communications device having a rotating display and a camera.

2. Brief Description of Prior Developments

U.S. Pat. Nos. D392,968 and D447,740 disclose communicators which have two housing sections pivotably attached to each other and two display screens on one of the housing sections. Mobile telephones which have cameras for taking digital photographs or for taking videos are also known in the art (image phones). There exist problems with conventional image phones, namely, in regard to screen orientation and camera lens protection.

Regarding screen orientation, landscape orientated screens are generally much more suited to picture capture, as in all digital cameras. However finding good ergonomic form factors for this is difficult in image phones. Portrait screens fit better into a small compact phone and are generally preferred for phone use. The conflict between landscape and portrait for different uses is a problem.

Regarding camera lens protection, the protection of camera lenses from dirt and damage is becoming more critical as the image quality expected from camera phones is increasing. There is a desire for lens covers that are intuitive; which cannot accidentally be left open, and are simple to use.

In the past, these problems were either not addressed, or a compromise between all the issues was settled for. Many phones take pictures using a portrait screen, but only using a central landscape strip image in the portrait screen. This does not utilize the full screen. Often, camera lenses are just covered by a clear cover or part of the case, which can become dirty or scratched, affecting the picture quality, or a small fiddly sliding opaque cover over the lens is used.

SUMMARY OF THE INVENTION

In accordance with one aspect of the present invention, a hand-held mobile communications device is provided including a housing; a movable section movably mounted to the housing; and at least one spring. The movable section includes a display screen. The movable section is adapted to axially rotate relative to the housing to move the movable section between a first portrait position and a second landscape position. The spring biases the movable section relative to the housing towards the first position or towards the second position.

In accordance with another aspect of the present invention, a hand-held mobile communications device is provided comprising a housing; a movable section movably mounted to the housing; and a first camera. The movable section comprises a display screen. The movable section is adapted to axially rotate relative to the housing to move the movable section between a first portrait position and a second landscape position. The first camera comprises a lens which is covered when the movable section is in the first portrait position and which is automatically uncovered when the movable section is moved towards the second landscape position.

In accordance with another aspect of the present invention, a hand-held mobile communications device is provided comprising a housing; a display screen located at a front side of the housing; a keypad located at a front side of the housing; a movable section located at a rear side of the housing; and a camera. The movable section is located behind the display screen and is adapted to axially rotate relative to the housing to move the movable section between a first portrait position and a second landscape position. The camera comprises a lens which is covered when the movable section is in the first portrait position and which is uncovered when the movable section is in the second landscape position.

In accordance with one method of the present invention, a method of positioning a display screen in a hand-held mobile communications device is provided comprising providing the hand-held mobile communications device with a housing and a movable section rotateably mounted on the housing, wherein the movable section comprises the display screen; rotating the movable section relative to the housing to move the display screen from a first portrait orientation on the housing to a second landscape orientation on the housing; and spring biasing the movable section relative to the housing towards the first position or the second position.

In accordance with another aspect of the present invention, a method of positioning a display screen in a hand-held mobile communications device is provided comprising providing the hand-held mobile communications device with a housing and a movable section rotateably mounted on the housing, wherein the movable section comprises the display screen; rotating the movable section relative to the housing to move the display screen from a first portrait orientation on the housing to a second landscape orientation on the housing; and automatically uncovering a camera lens of the hand-held mobile communications device when the movable section is moved from the first position towards the second position.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
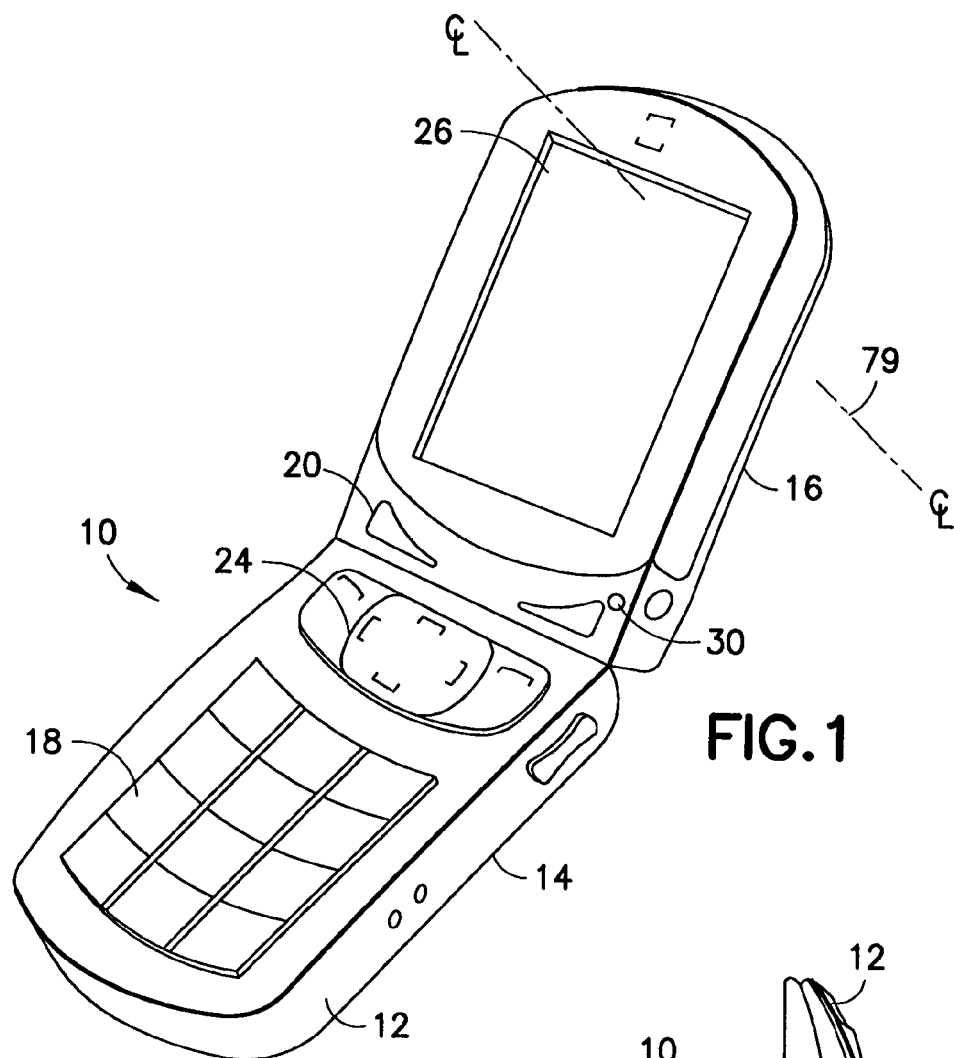
FIG. 1 is a perspective view of a flip phone incorporating features of the present invention.

Referring to FIG. 1, there is shown a perspective view of a mobile communications device 10 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

Figure 2:
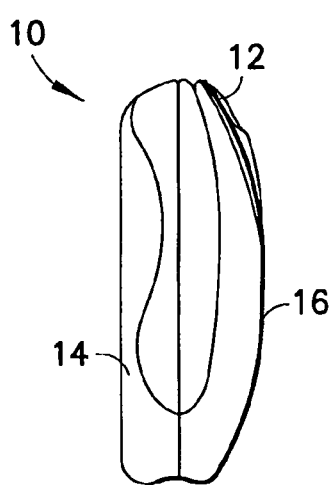
FIG. 2 is a side view of the flip phone shown in FIG. 1 in a collapsed position.
Figure 3:
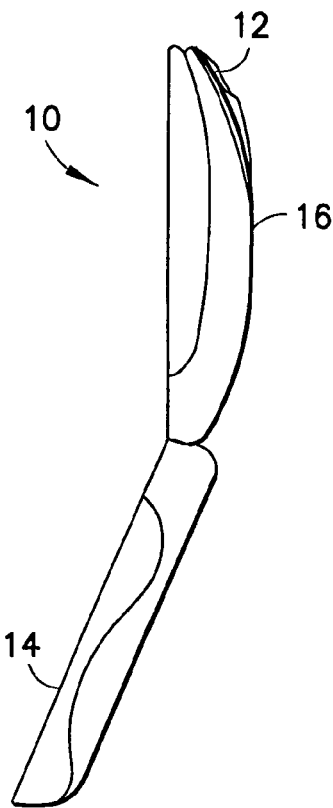
FIG. 3 is a side view of the flip phone shown in FIG. 1 in an open position.

In the embodiment shown, the mobile communications device 10 comprises a mobile telephone. However, features of the present invention could be used in other types of mobile communications devices, such as a mobile hand-held, Internet enabled game for example. The telephone 10 is a hand-held flip phone. However, in alternate embodiments, the telephone could comprise any suitable type of telephone including a mono-block type telephone or a communicator bi-fold type telephone. Referring also to FIGS. 2 and 3, the telephone 10 comprises a housing 12. The housing 12 comprises a first portion 14 and a second portion 16. The second portion 16 is pivotably attached to the first portion 14. As seen in FIG. 2, the second portion 16 can be collapsed over the first portion 14 into a general closed clamshell shape. As seen in FIG. 3 the second portion 16 can be opened relative to the first portion 14 for use of the telephone 10.

Figure 4:
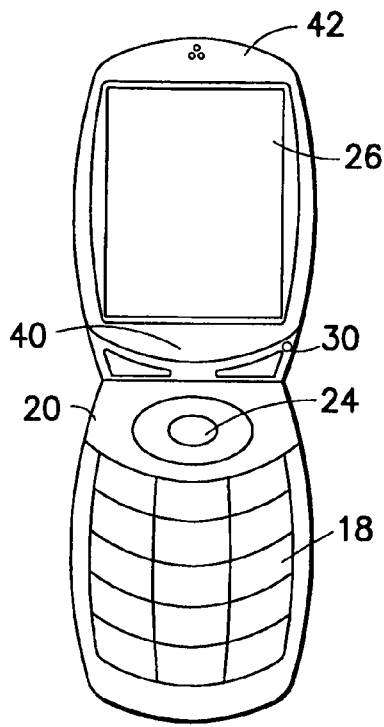
FIG. 4 is a front view of the flip phone shown in FIG. 1.
Figure 5:
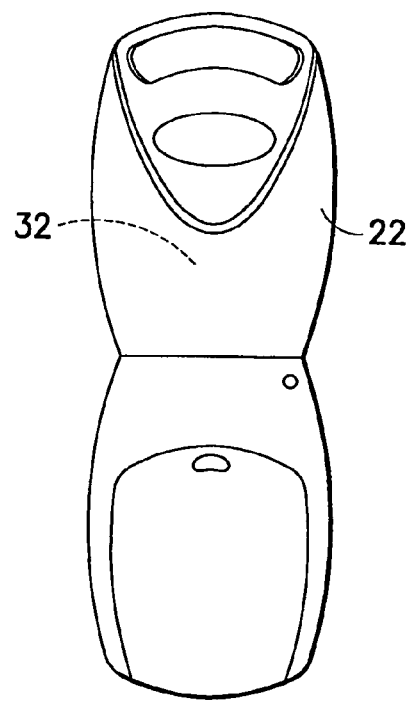
FIG. 5 is a rear view of the flip phone shown in FIG. 1.

Referring also to FIGS. 4 and 5, when the housing is open, the telephone 10 comprises a front face 20 and a rear face 22. The telephone 10 comprises a transceiver, an antenna, a battery, a keypad 18 and a control input section 24 on the front face 20. The control input section 24 could comprise input keys and/or an input roller and/or joystick or similar device. The telephone 10 also comprises a display screen 26. The display screen 26 could comprise a touch screen. The display screen 26 is mounted on the second portion 16 and can be viewed at the front face 20 when the second portion 16 is open. The display screen 26 has a general rectangular shape and, as seen best in FIG. 4, is orientated in a general portrait orientation. In this portrait position, the height of the screen is larger than the width of the screen. However, in alternate embodiments, the display screen 26 could comprise any suitable type of shape. The height of the movable section is also larger than the width of the movable section, but any suitable shaped movable section could be provided.

Figure 6:
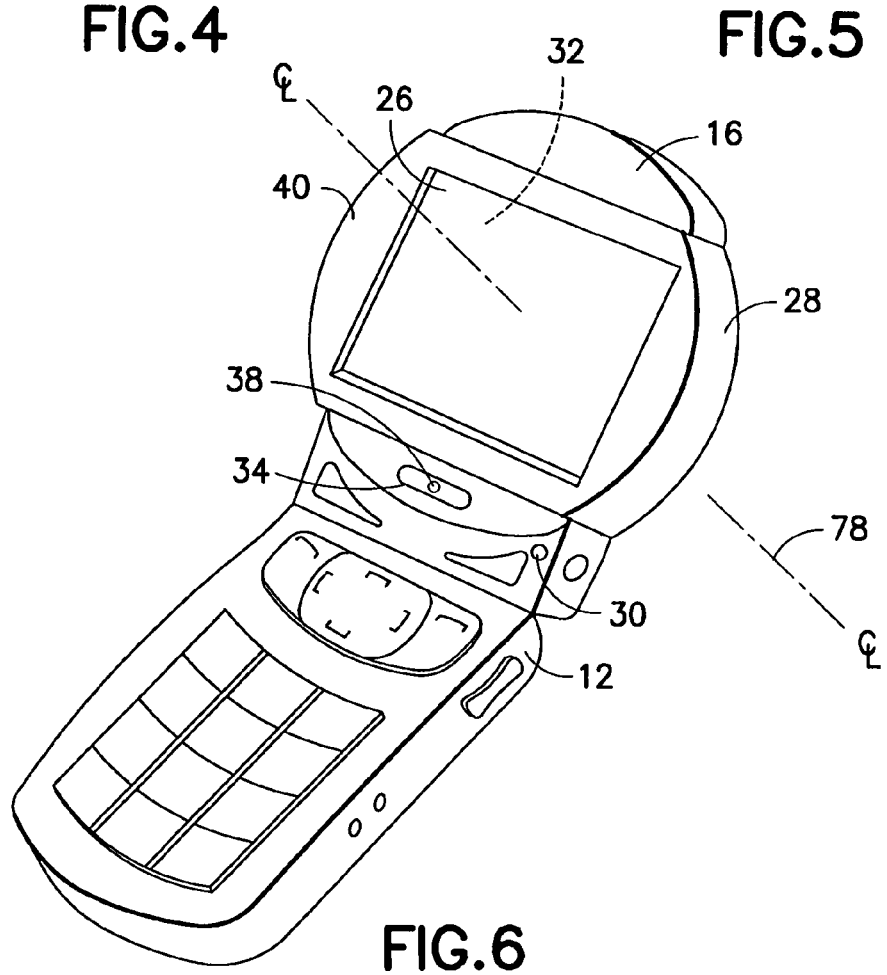
FIG. 6 is a perspective view as in FIG. 1 of the flip phone with the movable section moved to a landscape position.
Figure 7:
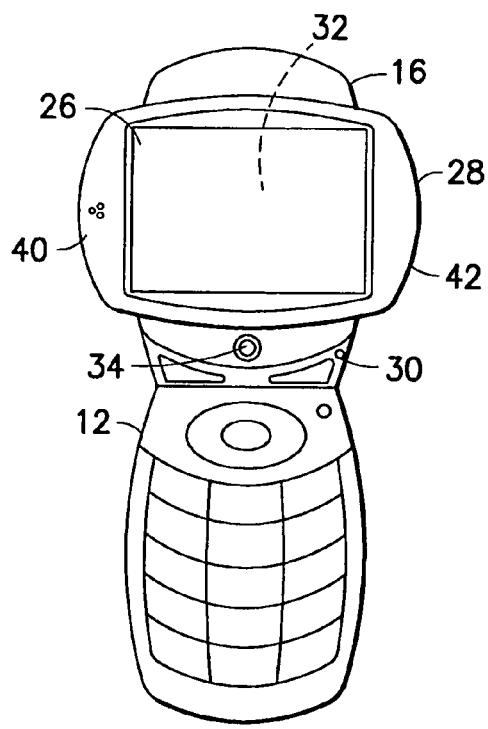
FIG. 7 is a front view of the flip phone shown in FIG. 6.
Figure 8:
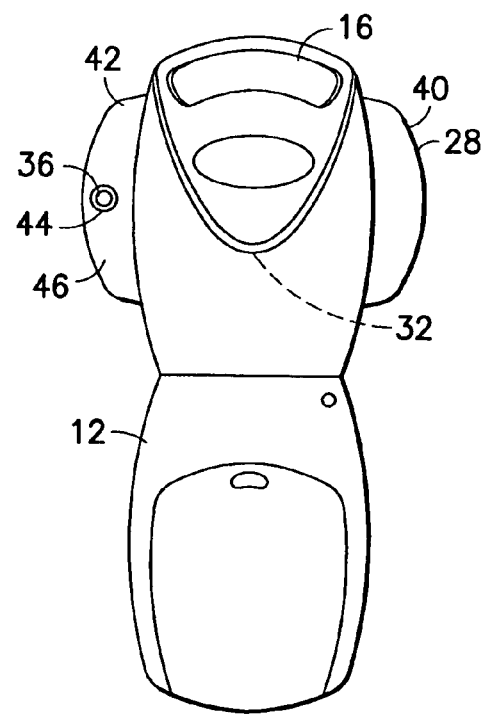
FIG. 8 is a rear view of the flip phone shown in FIG. 6.

Referring now also to FIGS. 6-8, the telephone 10 comprises a movable section 28. The movable section 28 comprises the display screen 26. The movable section 28 is rotatably mounted to the second portion 16 of the housing 12. In the embodiment shown, the movable section 28 comprises a general lozenge shaped. However, In alternate embodiments, the movable section 28 could comprise any suitable type of shape. The movable section 28 is rotatably mounted at the front face 20. The movable section 28 is adapted to rotate relative to the housing 12 90 degrees from the position shown in FIGS. 1 and 4 to the position shown in FIGS. 6 and 7. In this landscape position shown in FIGS. 6 and 7, the width of the screen is larger than the height of the screen. The width of the movable section is also larger than the height of the movable section.

FIGS. 1 and 4 show the movable section 28 at a first portrait position. In this first portrait position, the display screen 26 is orientated in its general portrait position shown. FIGS. 6 and 7 shows the movable section 28 at a second landscape position. In this second landscape position, the display screen 26 is orientated in a general landscape position shown. As used herein, the terms "portrait" and "landscape" are used to differentiate between two different orientations of the display screen 26 when the display screen has a rectangular shape. However, the display screen could have other shapes and, therefore, besides the classical definitions of the terms "portrait" and "landscape" for a rectangular screen, the terms "portrait" and "landscape" are intended to indicate two different orientations for any given shape of screen. Features of the present invention could also be used with a symmetrical screen, such as a square screen. Although "portrait" and "landscape" normally infer a 90 degree difference in orientation, the two different first and second positions could comprise more or less than a 90 degree difference in orientation.

The telephone 10 could comprise a user actuatable latch 30 to retain the movable section 28 at either its portrait position or its landscape position. The telephone 10 could also comprise one or more springs 32. The spring(s) 32 could be adapted to bias the movable section 28 towards either its portrait position or its landscape position. For example, when the latch 30 is actuated by the user, the movable section 28 could automatically swing or rotate the movable section from its portrait position to its landscape position. Alternatively, or additionally, when the latch 30 is actuated by the user, the movable section 28 could automatically swing or rotate from its landscape position to its portrait position. However, in an alternate embodiment, the spring(s) 32 and the latch 30 might not be provided.

The telephone 10 comprises a first camera 34 (see FIGS. 6 and 7) and a second camera 36 (see FIG. 8). However, in alternate embodiments, the telephone could comprise more or less than two cameras. The first camera 34 comprises a video called camera. The first camera 34 can send pictures of the user to a person on the other end of the phone call. The telephone 10 would normally be held in a speakerphone type of position rather than an headset type of position during this type of video telephone communication. The first camera 34 is mounted on the second portion 16 of the housing 12.

The first camera 34 comprises a lens 38 which is located at the front face 20. A protective window could be located over the lens. When the movable section 28 is located at its portrait position, a portion 40 of the movable section 28 is located over the lens 38. Thus, the movable section 28 covers the lens 38 when the movable section 28 is at its portrait position. However, when the movable section 28 is moved to its landscape position, the lens 38 becomes uncovered as seen in FIGS. 6 and 7. The portion 40 of the movable section 28 is rotated to become a side portion of the movable portion 28. The movable section 28 functions as a cover for the lens 38 of the first camera 34 when the movable section is in its portrait position. As seen in comparing FIG. 5 to FIG. 8, the side portion 40, which was formerly a bottom portion in the portrait position, extends past a lateral side of the second portion 16 of the housing 12 in the landscape position.

The second camera 36 preferably comprises a high-resolution still picture digital camera. However, any suitable type of camera could be provided for the first and second cameras 34, 36. The second camera 36 is mounted on the movable section 28. More specifically, the second camera 36 is mounted on a portion 42. The portion 42 is a top portion in the portrait position of the movable section 28 and a side portion in the landscape position. The camera 36 comprises a lens 44 which is located at a rearward facing side 46 of the movable section 28. A protective cover window could be provided over the lens 44. As seen in FIG. 5, the rearward facing side 46 of the movable section 28 is substantially completely covered by the second portion 16 of the housing 12 when the movable section 28 is at its portrait position. However, as seen in FIG. 8, the rearward facing side 46 of the movable section 28 is uncovered at the portions 40, 42 when the movable section 28 is at its landscape position. Thus, when the movable section 28 is at its portrait position, as shown in FIG. 5, the lens 44 of the second camera 36 is covered by the second portion 16 of the housing 12. However, when the movable section is moved to its landscape position, as shown in FIG. 8, the lens 44 of the second camera 36 is automatically uncovered. The lens 44 of the second camera 36 can be automatically covered again by the housing 12 when the movable section 28 is moved back to its portrait position.

When the movable section 28 is at its landscape position, both of the movable section's portions 40, 42 extend past the lateral sides of the housing's second portion 16. This forms the telephone with a general circular shaped portion. However, when the movable section 28 is at its portrait position, the same portion of the telephone 10 has a general lozenge or elongate shape (or could be a rectangular shape). The movable section 28 is preferably mounted to the second portion 16 of the housing 12 to axially rotate about a center axis 78 (see FIG. 6) extending through the movable section 28 (and preferably about a center axis extending through the display screen 26). However, in an alternate embodiment, the rotational axis could be located off center from the center of the movable section 28, such as at axis 79 shown in FIG. 1 for example.

The movable section 28 preferably rotates in a planar fashion; along a single plane relative to the second portion 16. In an alternate embodiment, the movable section 28 could be adapted to move in multiple axes or planes. In the embodiment shown, the movable section 28 is adapted to be rotated only 90 degrees between its first and second positions. However, in an alternate embodiment, the movable section 28 could be adapted to rotate 180 degrees. The movable section 28 could be adapted to rotate more than 180 degrees if a suitable electrical connector is provided between the movable section 28 and the housing 12. However, in a preferred embodiment, electrical wiring is used to connect the electronic components inside the movable section 28 to the electronic components inside the housing 12.

By use of a simple rotary mechanism, the screen on the phone flips from landscape to portrait (and from portrait to landscape). This could be implemented by the press of a button. The mechanism would be sprung to an open position and suitably damped by a dampening system (not shown). In doing so, the screen can reveal a camera, or probably two, one facing towards the user (for video calls) and one away from the user for higher resolution photos. The form of the design creates a very aesthetic circle shape when open.

Various issues are solved with this invention. The present invention solves the problem of screen orientation and camera lens protection. Landscape orientated screens are generally much more suited to picture capture, as in all digital cameras. However finding good ergonomic form factors for this was difficult in the past. Portrait screens fit better into a small compact phone and are generally preferred for phone use. The conflict between landscape and portrait for different uses is a problem which the present invention overcomes. The protection of camera lens from dirt and damage is becoming more critical as the image quality expected from camera phones is increasing. Users require lens covers that are intuitive, cannot accidentally be left open and are simple to use. The present invention addresses this problem.

The present invention provides a new concept for overcoming various viewing and camera protection issues in an imaging phone. Camera phones and picture viewers are rapidly becoming the norm. Therefore, it is important to protect new and exciting form factors.

The present invention provided better lens protection. This solution protects and completely hides both camera lenses with one simple mechanical movement. Some designs hide a camera away behind another part of the phone (such as the Nokia Model No. 7650), but the present invention provides the best protection and most intuitive use.

The present invention allows for both portrait and landscape use of the display screen. Portrait and landscape screen use becomes available without necessarily altering the orientation on the user interface (UI). The closed position (portrait position) can be used as a neat and compact standard phone, and in the open position (landscape position) as a camera viewfinder and also a picture/movie viewer.

The present invention provides an intuitive and simple use. The simple mechanics mean that it is very intuitive; users would be able to use the product immediately. The shape of the design also encourages the user to close the movable section 28 after use. This results in the cameras, inputs, etc., being inclined to be protected.

Figure 9:
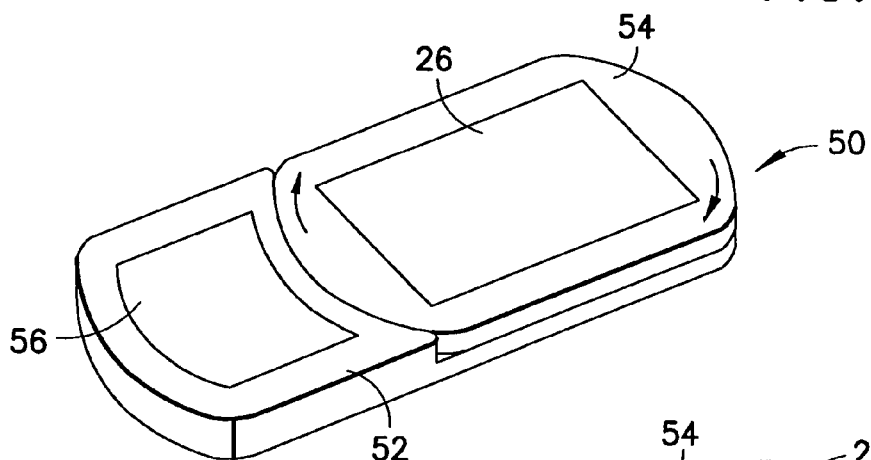
FIG. 9 is a schematic perspective view of an alternate embodiment of the present invention with the movable section at a portrait position.
Figure 10:
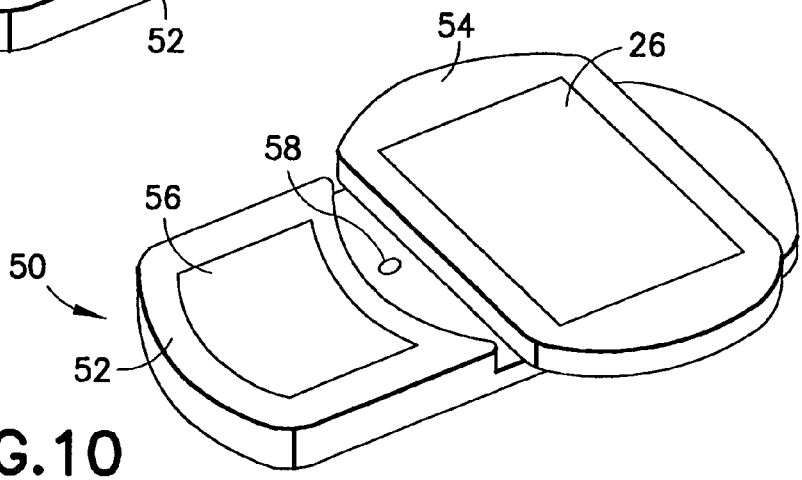
FIG. 10 is a schematic perspective view as in FIG. 9 with the movable section at a landscape position.

Referring now to FIGS. 9 and 10, schematic perspective illustrations of an alternate embodiment of the present invention is shown. In this embodiment the hand-held mobile communications device 50 comprises a mobile telephone having a general mono-block type configuration rather than a flip phone configuration. The telephone 50 comprises a housing 52 and a movable section 54. The housing 52 has a general rectangular or lozenge shape. The telephone 50 comprises an input section 56, such as a keypad. The movable section 54 is rotatably mounted to the housing 52 at the front face of the housing. The movable section comprises a display screen 26. The telephone 50 also comprises a camera 58.

The movable section 54 is movable from a portrait position as shown in FIG. 9 and a landscape position as shown in FIG. 10. In the portrait position shown in FIG. 9 the hand-held mobile conrunications device 50 has a general lozenge front profile. The display screen 26 is orientated in a portrait orientation relative to the housing 52. In the landscape position shown in FIG. 10 the display screen 26 is orientated in a landscape orientation relative to the housing 52. When the movable section 54 is located in its portrait position, a portion of the movable section 54 covers the camera 58. When the movable section 54 is located in its landscape position, the portion of the movable section which formally covered the camera 58 is moved away from the camera 58. Thus, the camera 58 is uncovered. A camera could be provided on the rear side of the movable section 54. A camera might not be provided on the front side of the telephone.

Figure 11:
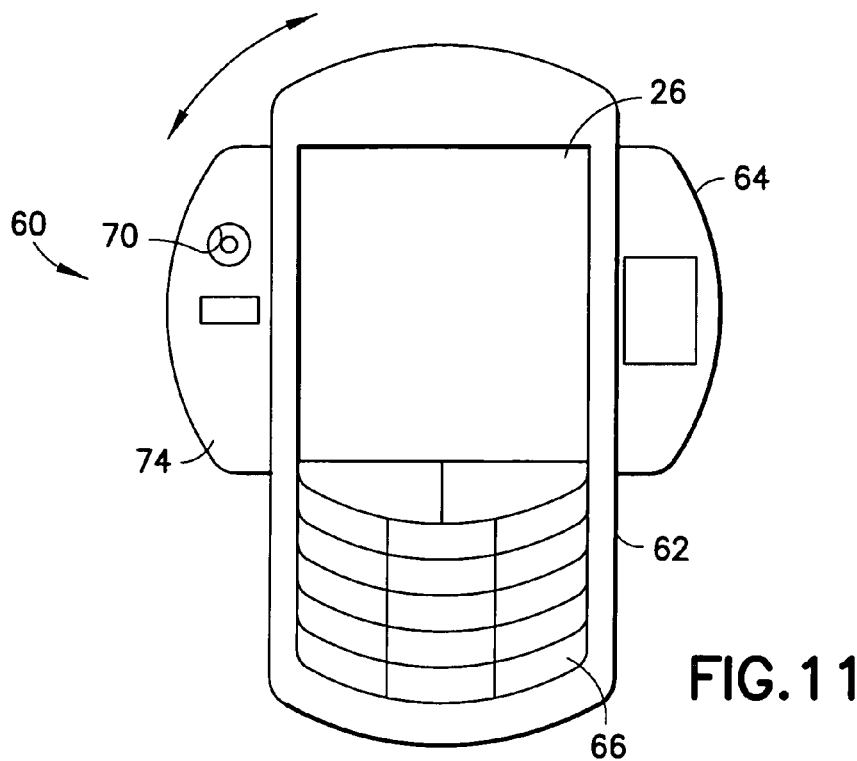
FIG. 11 is a front view of an alternate embodiment of the present invention.
Figures 12, 13:
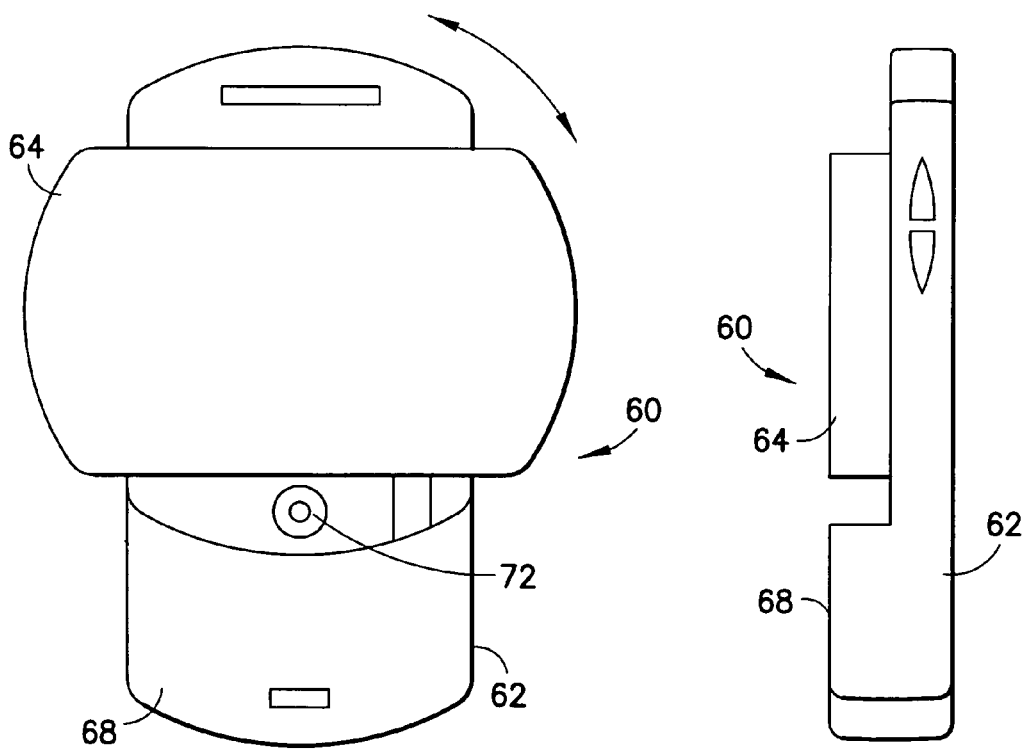
FIG. 12 is a rear view of the alternate embodiment shown in FIG. 11.
FIG. 13 is a side view of the alternate embodiment shown in FIG. 11.

Referring now to FIGS. 11-13, schematic illustrations of another alternate embodiment of the present invention is shown. In this embodiment the hand-held mobile communications device 60 comprises a mobile telephone having a general mono-block type configuration rather than a flip phone configuration. The telephone 60 comprises a housing 62 and a movable section 64. The housing 62 has a general rectangular or lozenge shape. The telephone 60 comprises an input section 66, such as a keypad. The movable section 64 is rotatably mounted to the housing 62 at the rear side 68 of the housing. The housing, rather than the movable section, comprises the display screen 26. The display screen 26 is mounted to the front side of the housing. The telephone 60 also comprises two cameras 70, 72.

The movable section 64 is movable between a portrait position (not shown) and a landscape position as shown in FIGS. 11-13. In the portrait position the movable section 64 is located substantially entirely behind the housing 62. The display screen 26 is always orientated in a portrait orientation relative to the housing 52. The first camera 70 comprises a video image camera. First camera 70 is mounted in the movable section 64 and has a lens at a forward facing side 74 of the movable section. The second camera 72 comprises a high-resolution digital still picture camera. The second camera 72 is mounted in the housing 62 and has a lens at the rear side 68 of the housing.

When the movable section 64 is located in its portrait position, a portion of the movable section 64 covers the lens of the second camera 72. A portion of the housing 62 also covers the lens of the first camera 70. When the movable section 64 is located in its landscape position, the portion of the movable section which formally covered the second camera 72 is moved away from the second camera 72. Thus, the second camera 72 is uncovered. Similarly, the portion of the movable section which houses the first camera 70 is moved away from the housing 62. Thus, the first camera 70 is uncovered.

Figure 14:
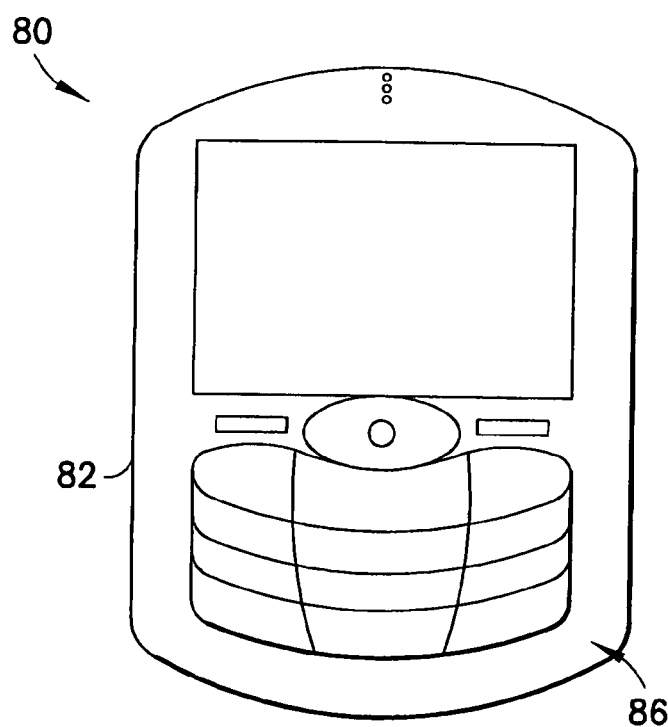
FIG. 14 is a front view of another alternate embodiment of the present invention.
Figures 15, 16:
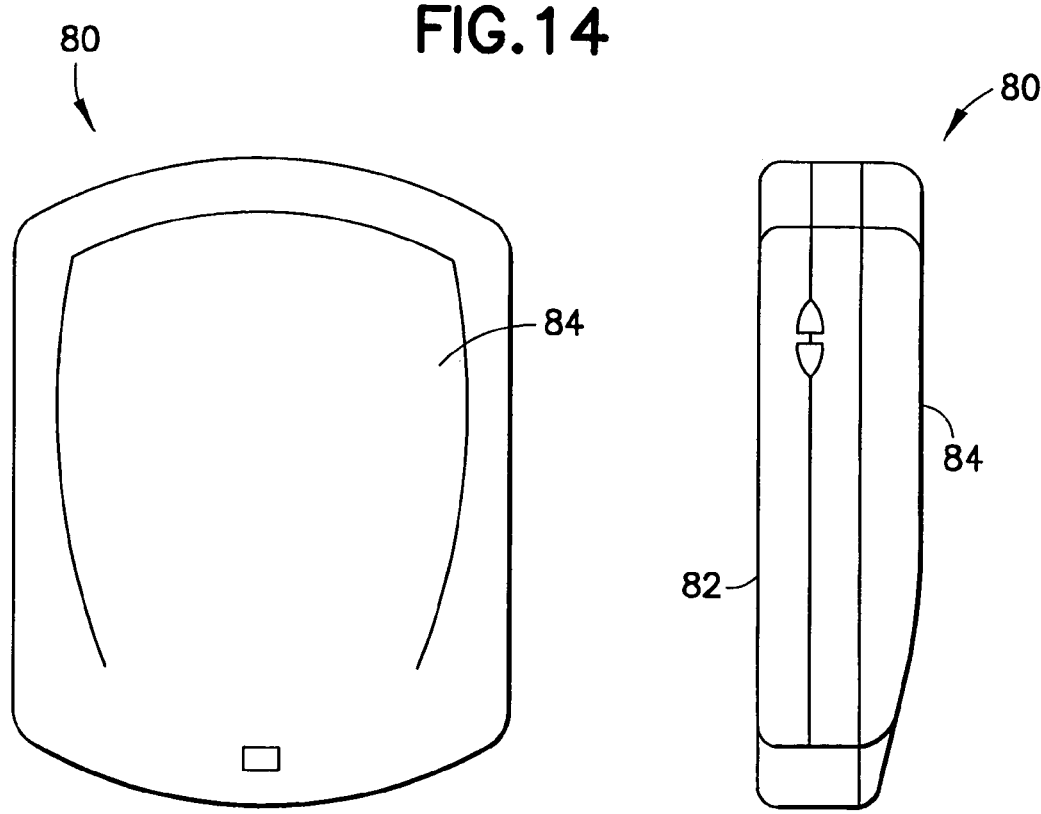
FIG. 15 is a rear view of the alternate embodiment shown in FIG. 14.
FIG. 16 is a side view of the alternate embodiment shown in FIG. 14.

In the embodiments described above, the housings comprise pockets or recessed areas which receive the movable sections. Referring now to FIGS. 14-19, an alternate embodiment of a hand-held mobile communications device will be described. In this embodiment, the device comprises a mobile telephone 80. FIGS. 14-16 show the telephone 80 in a first configuration. In this first configuration the telephone can be used as a telephone or stored by the user. The telephone 80 generally comprises a housing 82 and a movable section 84. The housing 82 and the movable section 84 both have a general rectangular or lozenge shape. The telephone 80 comprises an input section 86, such as a keypad and a control input, such as a roller, or joystick, or three-way key, etc. The movable section 84 is rotatably mounted to the housing 82 at the rear side 88 (see FIGS. 18-19) of the housing. The housing, rather than the movable section, comprises the display screen 26. The display screen 26 is mounted to the front side of the housing. The telephone 80 also comprises two cameras 70, 72 (see FIGS. 17 and 18).

Figure 17:
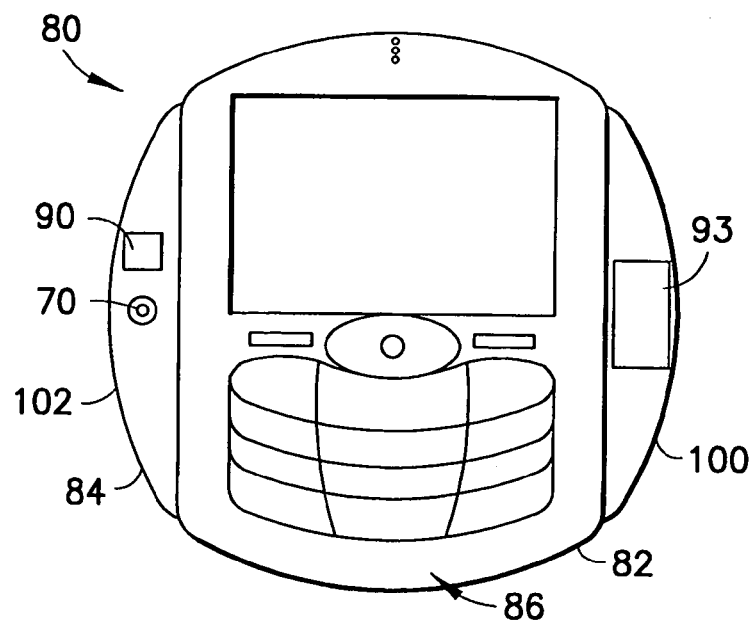
FIG. 17 is a front view as in FIG. 14 with the movable section moved to a landscape position.
Figure 18:
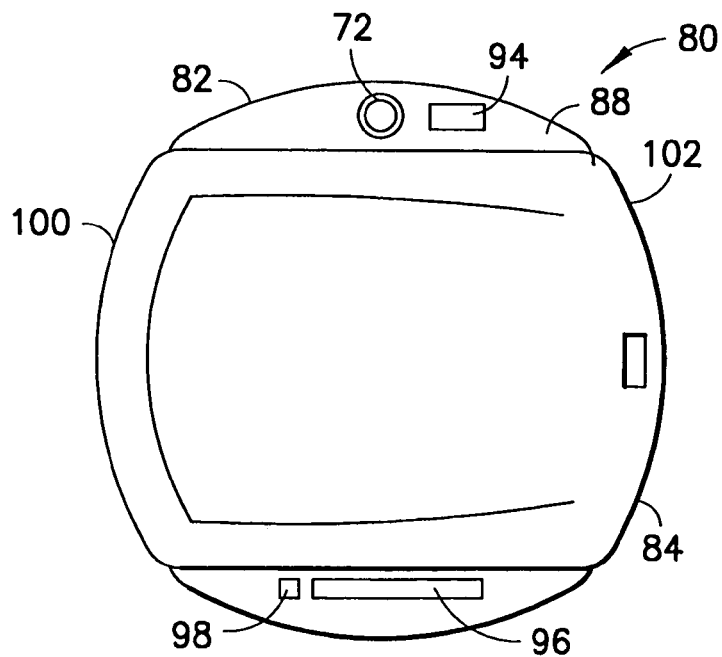
FIG. 18 is a rear view of the device shown in FIG. 17.
Figure 19:
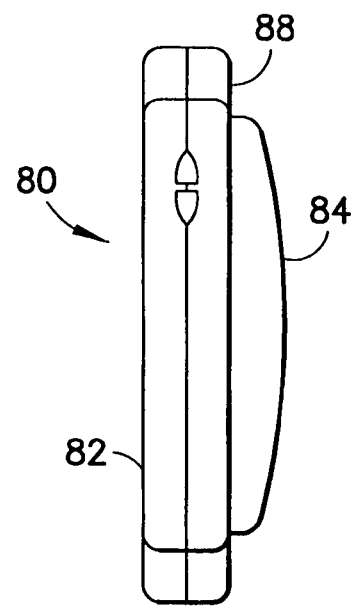
FIG. 19 is a side view of the device shown in FIG. 17
Figure 20:
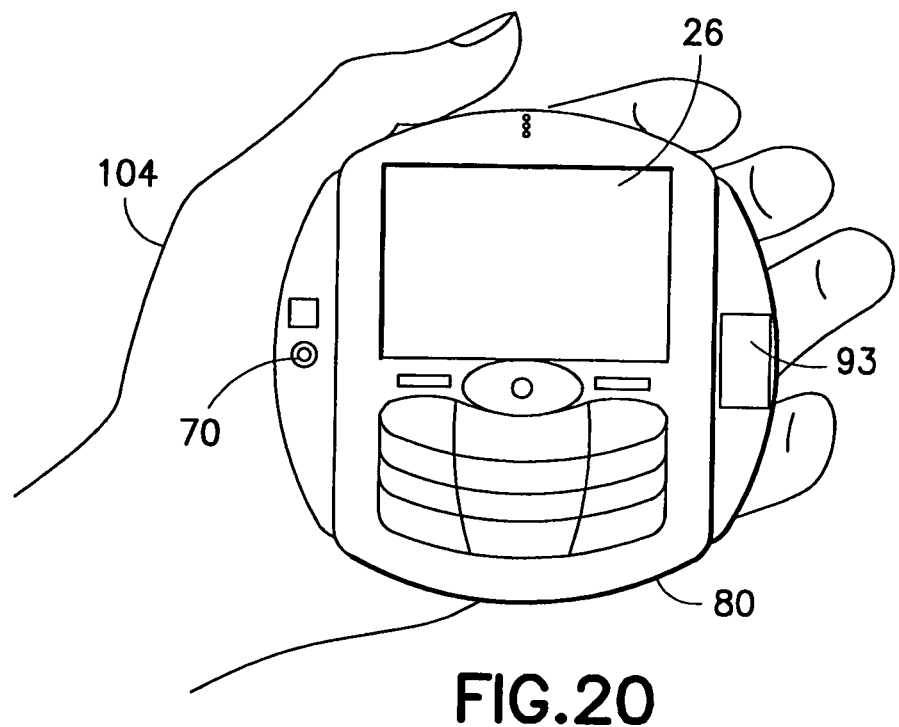
FIG. 20 is a schematic illustration showing the device as shown in FIG. 17 being held by a hand of the user for a video call mode.
Figure 21:
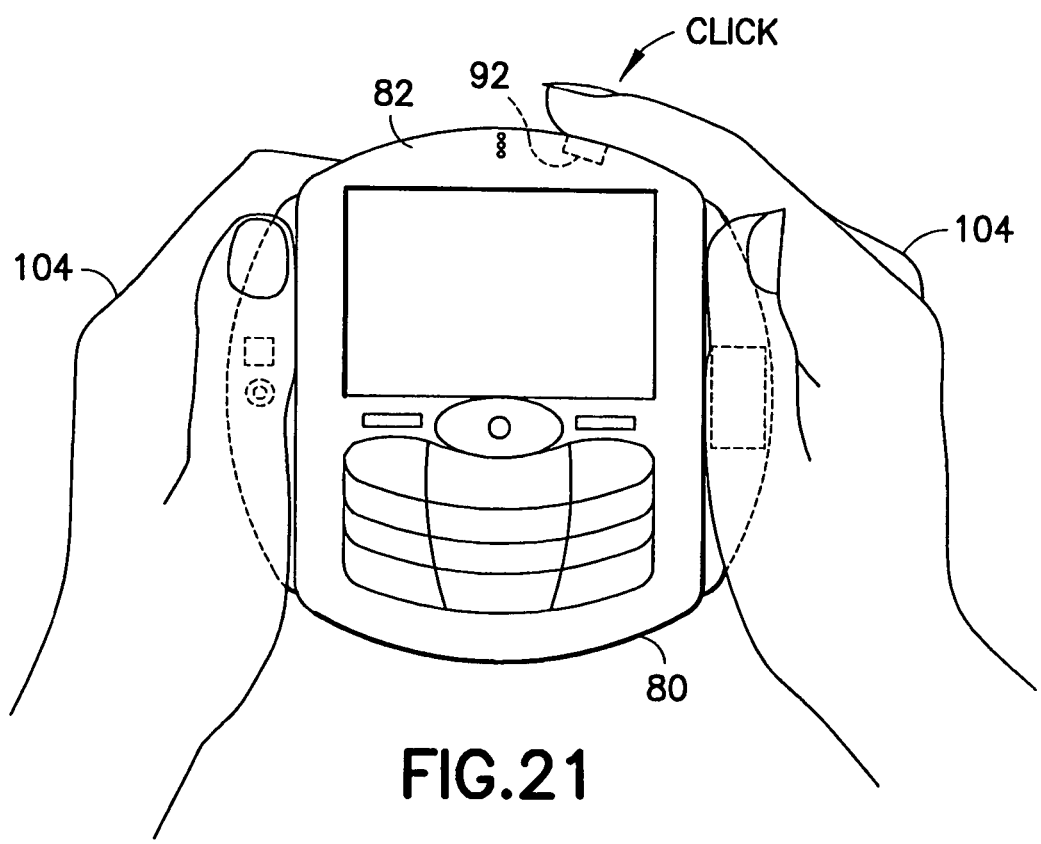
FIG. 21 is a schematic illustration showing the device as shown in FIG. 17 being held by hands of a user for a camera mode.

Referring also to FIGS. 17-19, the telephone 80 is shown in a second configuration. In this second configuration the movable section 84 has been rotated 90 degrees relative to the housing 82. As seen best in comparing FIG. 16 to FIG. 19, the housing 82 and the movable section 84 form general rotating halves of the telephone 80. The movable section forms the entire rear face of the hand-held mobile communications device when the movable section is in the first portrait position. The movable section 84 could comprise the battery for the telephone. The movable section 84 also comprises a light or LED flash 90 and a second screen 93, such as a mini-screen. However, in alternate embodiments any suitable type of flash or video light could be provided, and the second screen might not be provided. The device could alternatively or additionally comprise an IR or BLUETOOTH communications device. A camera picture taking button 92 is preferably located on the housing 82 as shown in FIG. 21. The second configuration shown in FIGS. 17-19 allows the user to use the telephone in a video call mode, as illustrated by FIG. 20, or in a camera mode as illustrated by FIG. 21.

As seen in FIG. 18, the housing 82, in addition to housing the second camera 72, also houses a flash 94 and electrical connectors 96, 98. In the second configuration, two portions 100, 102 of the movable section 84 extend outward past the lateral sides of the housing 82. These portions of 100, 102 form side portions which, as shown in FIG. 21, former grasping areas for a user's hands 104 to grasping the device 80 while taking pictures. Thus, the user's hands 104 are moved away from the camera 72 and flash 94. As seen in FIG. 20, in the second configuration the device 80 has a substantially circular shape which can easily fit in the palm of the user's hand 104 such that portions of the user's hand are kept away from the display screen 26 and the camera 70.

As the drawings show, the invention could be implemented in a number of different phone designs. Mono block phones and flip phones could utilise this design and each has different benefits. As long as the design could be sufficiently protected it could be launched initially as a simple version and then further products released with more features such as hidden cameras, key mats, etc.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A hand-held mobile communications device comprising:
   a housing;
   a movable section movably mounted to the housing; and
   a display located at a front side of the housing,
   wherein the movable section is adapted to axially rotate relative to the housing to move the movable section between a first position and a second different position, wherein the movable section is connected to the housing with a front side of the movable section being adapted to slide along a rear side of the housing, wherein opposite side portions of the movable section extends past lateral sides of the housing when the movable section is in the second position such that, when the housing and the movable section are in the second position, the hand-held mobile communications device has a general round front profile.

2. A hand-held mobile communications device as in claim 1 further comprising a camera mounted to the housing or the movable section, wherein when the housing and the movable section are in the second position, the opposite side portions of the movable section form grasping areas for a user's hand.

3. A hand-held mobile communications device comprising:

a housing; and a movable section movably mounted to the housing;

wherein the movable section is adapted to axially rotate relative to the housing to move the movable section between a first position and a second different position, wherein the movable section is connected to the housing with a front side of the movable section being adapted to slide along a rear side of the housing, wherein when the movable section is in the second position opposite side portions of the movable section extends past lateral sides of the housing such that the hand-held mobile communications device has a general round front profile, and wherein when the housing and the movable section are in the first position, the hand-held mobile communications device has a general lozenge front profile.

4. A hand-held mobile communications device as in claim 3 further comprising a display at a front side of the housing.

5. A hand-held mobile communications device as if claim 4 further comprising a keypad at the front side of the housing.

* * * * *